United States Patent
Ren et al.

(10) Patent No.: US 12,092,925 B2
(45) Date of Patent: Sep. 17, 2024

(54) BACKLIGHT MODULE AND LIQUID CRYSTAL DISPLAY DEVICE

(71) Applicant: WUHAN CHINA STAR OPTOELECTRONICS TECHNOLOGY CO., LTD., Hubei (CN)

(72) Inventors: Yuanyuan Ren, Hubei (CN); Mengjie Li, Hubei (CN); Chengxu Ma, Hubei (CN); Zhuo Zhang, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/753,052

(22) PCT Filed: Jan. 25, 2022

(86) PCT No.: PCT/CN2022/073860
§ 371 (c)(1),
(2) Date: Feb. 16, 2022

(87) PCT Pub. No.: WO2023/137779
PCT Pub. Date: Jul. 27, 2023

(65) Prior Publication Data
US 2024/0036396 A1    Feb. 1, 2024

(30) Foreign Application Priority Data
Jan. 18, 2022   (CN) .......................... 202210055385.6

(51) Int. Cl.
*G02F 1/13357*   (2006.01)
*F21V 8/00*     (2006.01)
*G02F 1/1335*   (2006.01)

(52) U.S. Cl.
CPC ..... *G02F 1/133605* (2013.01); *G02B 6/0055* (2013.01); *G02B 6/0088* (2013.01);
(Continued)

(58) Field of Classification Search
CPC ......... G02F 1/133605; G02F 1/133608; G02B 6/0055; G02B 6/0088; G02B 6/009
See application file for complete search history.

(56) References Cited

U.S. PATENT DOCUMENTS

2008/0030646 A1   2/2008  Go
2016/0091656 A1*  3/2016  Que ..................... G02B 6/0088
                                              362/382
(Continued)

FOREIGN PATENT DOCUMENTS

CN       101126852 A     2/2008
CN       201764409 U     3/2011
(Continued)

OTHER PUBLICATIONS

International Search Report in International application No. PCT/CN2022/073860, mailed on Oct. 10, 2022.
(Continued)

*Primary Examiner* — Christopher E Dunay
(74) *Attorney, Agent, or Firm* — PV IP PC; Wei Te Chung (57) ABSTRACT

The present application provides a backlight module and a liquid crystal display device; the first portion of the slit adhesive is formed with a notch, so that when internal stress generates in the slit adhesive due to environmental changes, the internal stress can be released through the notch, thereby preventing the slit adhesive from warping and improving the yield of the backlight module.

18 Claims, 4 Drawing Sheets

(52) U.S. Cl.
CPC ....... *G02B 6/009* (2013.01); *G02F 1/133608* (2013.01); *G02B 6/0051* (2013.01); *G02B 6/0053* (2013.01); *G02F 1/133607* (2021.01); *G02F 2202/28* (2013.01)

(56) References Cited

U.S. PATENT DOCUMENTS

| | | | |
|---|---|---|---|
| 2016/0341888 A1 | 11/2016 | Teragawa | |
| 2017/0045671 A1* | 2/2017 | Zeng | G02B 6/0065 |
| 2017/0139127 A1* | 5/2017 | Zeng | G02B 6/0055 |
| 2017/0276865 A1* | 9/2017 | Li | G02B 6/0065 |
| 2018/0321435 A1* | 11/2018 | Chang | G02B 6/005 |
| 2019/0293855 A1* | 9/2019 | Xiang | G02B 6/0053 |
| 2022/0155516 A1* | 5/2022 | Zhuang | G02B 6/0053 |

FOREIGN PATENT DOCUMENTS

| | | |
|---|---|---|
| CN | 204405998 U | 6/2015 |
| CN | 205643948 U | 10/2016 |
| CN | 205809487 U | 12/2016 |
| CN | 106990611 A | 7/2017 |
| CN | 207557623 U | 6/2018 |
| CN | 207817378 U | 9/2018 |
| CN | 109477933 A | 3/2019 |
| CN | 112198715 A | 1/2021 |
| JP | 2000089226 A | 3/2000 |

OTHER PUBLICATIONS

Written Opinion of the International Search Authority in International application No. PCT/CN2022/073860, mailed on Oct. 10, 2022.

Chinese Office Action issued in corresponding Chinese Patent Application No. 202210055385.6 dated Oct. 21, 2022, pp. 1-8.

\* cited by examiner

BACKLIGHT MODULE AND LIQUID CRYSTAL DISPLAY DEVICE

BACKGROUND OF INVENTION

Field of Invention

The present application relates to a field of display technology, and in particular, to a backlight module and a liquid crystal display device.

Description of Prior Art

With development of display devices, existing display devices have higher and higher requirements for reliability. In a liquid crystal display device, a slit adhesive is disposed on a side surface of a backlight and a top surface of an optical film for fixation, but during the testing and use of the liquid crystal display device, when the environment changes, the slit adhesive will expand and contract, resulting in internal stress, which leads to warping of the slit adhesive due to its own stress, causing a reliability problem.

Therefore, the existing liquid crystal display device has the technical problem that the slit adhesive will warp due to the internal stress when the environment changes.

SUMMARY OF INVENTION

Embodiments of the present application provide a backlight module and a liquid crystal display device, which are used to alleviate the technical problem of the existing liquid crystal display device that the slit adhesive will warp due to internal stress when the environment changes.

In order to solve the above-mentioned problems, the technical solutions provided by the present application are as follows:

The embodiment of the present application provides a backlight module, and the backlight module includes:
 a backplane;
 a reflective sheet disposed on one side of the backplane; and
 an optical film disposed on a side of the reflective sheet away from the backplane,
 wherein the backlight module further includes a slit adhesive, the slit adhesive includes a first portion located on a folded edge of the backplane and a second portion located on a side of the optical film away from the reflective sheet, and the first portion is formed with a notch.

In some embodiments, the notch extends from an edge of a side of the first portion away from the second portion toward the second portion, and a side of the notch is located at a junction between the first portion and the second portion.

In some embodiments, the backlight module further includes:
 a light guide plate disposed between the reflective sheet and the optical film; and
 a light source disposed on one side of the light guide plate;
 wherein the slit adhesive is disposed on opposite sides of the backplane and on a side opposite to a side where the light source is disposed, the notch is disposed on at least one of the slit adhesive on opposite sides of the backplane and the slit adhesive on the side opposite to the side where the light source is disposed.

In some embodiments, the notch includes at least a first notch and a second notch, and the first notch and the second notch are spaced apart from each other at the first portion of the slit adhesive.

In some embodiments, a distance between the first notch and a central axis of the first portion of the slit adhesive is equal to a distance between the second notch and the central axis of the first portion of the slit adhesive, and widths of the first notch and the second notch are equal.

In some embodiments, the first portion of the slit adhesive includes a plurality of notches, and a distribution density of the notches located at a middle region of the first portion of the slit adhesive is greater than or equal to a distribution density of the notches located at an edge region of the first portion of the slit adhesive.

In some embodiments, the backlight module further includes a light source, the light source is disposed between the reflective sheet and the optical film, and the slit adhesive is disposed on at least one of four sides of the backplane.

In some embodiments, the slit adhesive further includes a stitching line, the stitching line is disposed at the junction between the first portion and the second portion, a distance between the first portion of the slit adhesive and the stitching line is greater than or equal to a distance between the second portion of the slit adhesive and the stitching line.

In some embodiments, the notch extends from an edge of a side of the first portion away from the second portion toward the second portion, a distance between a side of the notch close to the junction between the first portion and the second portion is greater than zero; or a side of the notch close to the junction is located at the second portion.

Meanwhile, another embodiment of the present application provides a liquid crystal display device, the liquid crystal display device includes a liquid crystal display panel and a backlight module, and the backlight module includes:
 a backplane;
 a reflective sheet disposed on one side of the backplane; and
 an optical film disposed on a side of the reflective sheet away from the backplane,
 wherein the backlight module further includes a slit adhesive, the slit adhesive includes a first portion located on a folded edge of the backplane and a second portion located on a side of the optical film away from the reflective sheet, and the first portion is formed with a notch.

In some embodiments, the notch extends from an edge of a side of the first portion away from the second portion toward the second portion, and a side of the notch is located at a junction between the first portion and the second portion.

In some embodiments, the backlight module further includes:
 a light guide plate, disposed between the reflective sheet and the optical film;
 a light source, disposed on one side of the light guide plate;
 wherein the slit adhesive is disposed on opposite sides of the backplane and on a side opposite to a side where the light source is disposed, the notch is disposed on at least one of the slit adhesive on opposite sides of the backplane and the slit adhesive on the side opposite to the side where the light source is disposed.

In some embodiments, the notch includes at least a first notch and a second notch, and the first notch and the second notch are spaced apart from each other at the first portion of the slit adhesive.

In some embodiments, a distance between the first notch and a central axis of the first portion of the slit adhesive is equal to a distance between the second notch and the central axis of the first portion of the slit adhesive, and widths of the first notch and the second notch are equal.

In some embodiments, the first portion of the slit adhesive includes a plurality of notches, and a distribution density of the notches located at a middle region of the first portion of the slit adhesive is greater than or equal to a distribution density of the notches located at an edge region of the first portion of the slit adhesive.

In some embodiments, the backlight module further includes a light source, the light source is disposed between the reflective sheet and the optical film, and the slit adhesive is disposed on at least one of four sides of the backplane.

In some embodiments, the slit adhesive further includes a stitching line, the stitching line is disposed at the junction between the first portion and the second portion, a distance between the first portion of the slit adhesive and the stitching line is greater than or equal to a distance between the second portion of the slit adhesive and the stitching line.

In some embodiments, a distance between the first portion and the stitching line is equal to two-thirds to four-fifths of a length of the folded edge of the backplane.

In some embodiments, the notch extends from an edge at a side of the first portion away from the second portion toward the second portion, a distance between a side of the notch close to the junction between the first portion and the second portion is greater than zero; or a side of the notch close to the junction is located at the second portion.

In some embodiments, a width of the notch is greater than or equal to 0.5 mm.

The present application provides a backlight module and a liquid crystal display device; the backlight module includes a backplane, a reflective sheet, and an optical film, the reflective sheet is arranged on one side of the backplane, and the optical film is arranged on the side of the reflective sheet away from the backplane, wherein the backlight module further includes a slit adhesive, the slit adhesive includes a first portion located on the folded edge of the backplane and a second portion located on the side of the optical film away from the reflective sheet, and the first portion is formed with a notch. In the present application, the first portion of the slit adhesive is formed with a notch, so that when internal stress generates in the slit adhesive due to environmental changes, the internal stress can be released through the notch, thereby preventing the slit adhesive from warping and improving the yield of the backlight module.

BRIEF DESCRIPTION OF DRAWINGS

The technical solutions and other beneficial effects of the present application will be apparent through the detailed description of the specific embodiments of the present application in conjunction with the accompanying drawings.

DETAILED DESCRIPTION OF PREFERRED EMBODIMENTS

The technical solutions in the embodiments of the present application will be clearly and completely described in the following with reference to the accompanying drawings in the embodiments. It is apparent that the described embodiments are only a part of the embodiments of the present application, and not all of them. All other embodiments obtained by a person skilled in the art based on the embodiments of the present application without creative efforts are within the scope of the present application.

Embodiments of the present application provide a backlight module and a liquid crystal display device to alleviate the technical problem of warping due to internal stress when the environment changes in the existing liquid crystal display device.

Figure 1:
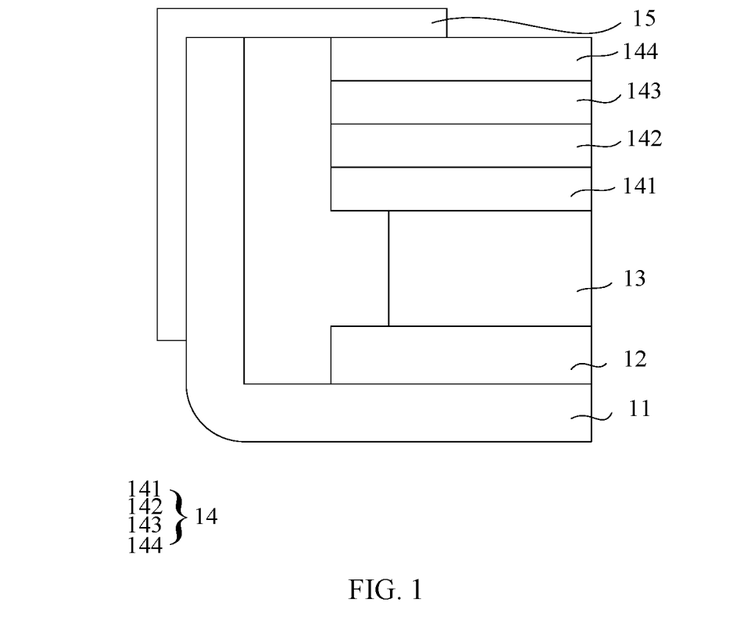
FIG. 1 is a first schematic diagram of a backlight module provided by an embodiment of the present application.
Figure 2:
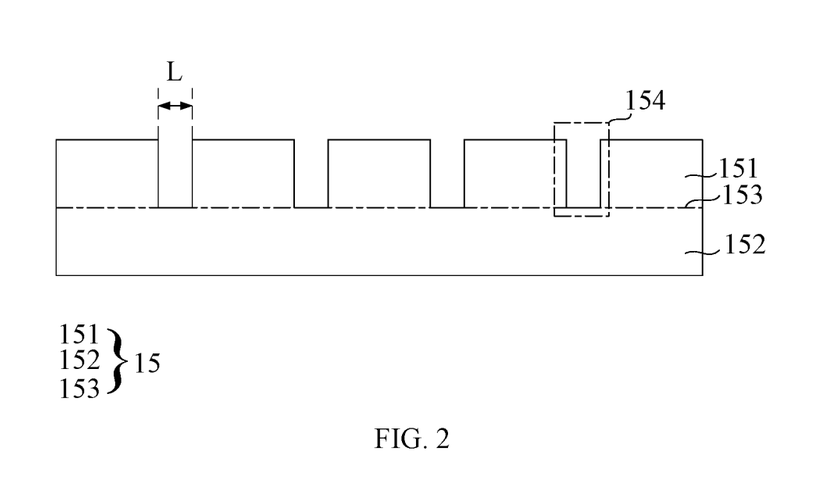
FIG. 2 is a first schematic diagram of a slit adhesive provided by the embodiment of the present application.

As shown in FIG. 1 and FIG. 2, an embodiment of the present application provides a backlight module, and the backlight module 1 includes:

a backplane 11;

a reflective sheet 12 disposed on one side of the backplane 11; and an optical film 14 disposed on a side of the reflective sheet 12 away from the backplane 11, wherein the backlight module 1 further includes a slit adhesive 15, the slit adhesive 15 includes a first portion 151 located on a folded edge of the backplane 11 and a second portion 152 located on a side of the optical film 14 away from the reflective sheet 12, and the first portion 151 is formed with a notch 154.

An embodiment of the present application provides a backlight module. In the backlight module, the first portion of the slit adhesive is formed with a notch, so that when internal stress generates in the slit adhesive due to environmental changes, the internal stress can be released through the notch, thereby preventing the slit adhesive from warping and improving the yield of the backlight module.

It should be noted that the first portion and the second portion of the sub-adhesive are not labeled in FIG. 1, because the first portion and the second portion are integral, rather than two separate parts. However, the first portion and the second portion can be distinguished from each other through a combined part of the folded edge or the opening of the backplane. For example, in FIG. 1, the second portion of the slit adhesive is disposed at the edge of the folded edge of the backplane, or a portion of the slit adhesive in contact with the side surface of the folded edge of the backplane is the first portion, and a portion of the slit adhesive in contact with the top surface of the folded edge of the backplane is the second portion.

It should be noted that, in FIG. 2, the first portion 151 and the second portion 152 are respectively labeled, but in the actual design process, the first portion and the second portion are integrally arranged, and the two portions are determined by the stitching line 153, the first portion and the second portion are not disposed separately.

In one embodiment, the notch extends from an edge of a side of the first portion away from the second portion toward the second portion, a distance between a side of the notch close to the junction between the first portion and the second portion is greater than zero; or a side of the notch close to the junction is located at the second portion. By arranging the notch on the first portion, wherein the distance between the side of the notch close to the junction and the junction between the first portion and the second portion is greater than zero, when the internal stress generates, the internal stress can be released from the notch, thereby preventing the slit adhesive from warping; or by extending the notch from the first portion to the second portion, the stress is relieved through the notch on the first portion and the second portion, and whether the internal stress generates in the first portion or the second portion, it can be relieved.

Specifically, the notch extends from the edge of the first portion away from the second portion to the second portion, and the side of the notch close to the junction is connected to the first portion and the second portion. A distance between the first portion and the stitching line is equal to two-thirds to four-fifths of a length of the folded edge of the backplane. By extending the notch toward the junction between the first portion and the second portion, the notch has a certain length, and the internal stress can be better relieved.

Specifically, the notch extends from the first portion to the second portion, and the length of the notch in the second portion is equal to one third to one half of the width of the second portion. By arranging the notchs on the first portion and the second portion, when stress is generated in the first portion and the second portion of the slit adhesive, the notches can better release the internal stress.

It should be noted that since the lateral length of the slit adhesive is greater than its longitudinal length, the lateral length of the slit adhesive is regarded as length and its longitudinal length is regarded as width; and in the process of setting the notch, the notch will be set along the longitudinal direction of the slit adhesive, and the width of the notch will be set smaller, and therefore, the notch along the longitudinal direction of the slit adhesive is regarded as length, and the notch along the lateral direction of the slit adhesive is regarded as width, which will not be repeated in the following embodiments, but it should be noted that the longitudinal length of the notch is not particularly limited to be greater than the lateral length of the notch, and the length and width of the notch can be set according to requirements.

When the distance is present between the notch and the junction between the first portion and the second portion, the stress relief effect is poor, and when the notch extends from the first portion to the second portion, it may cause the problem of light leakage. In one embodiment, as shown in FIG. 2, the notch 154 extends from the edge of the first portion 151 away from the second portion 152 to the second portion 152, and one side of the notch 154 is located at the junction between the first portion 151 and the second portion 152. By extending the notch from the first portion to the junction between the first portion and the second portion, when the internal stress generates in the slit adhesive, the internal stress can be released through the notch, and considering that the internal stress will generate in the first portion and the second portion, specifically may gather at the junction between the first portion and the second portion, it results in excessive stress at the junction between the first portion and the second portion, and an excessive risk of warping at the junction between the first portion and the second portion is caused. By extending the notch to the junction between the first portion and the second portion, the internal stress can be released through the notch. No matter whether the internal stress generates in the first portion or the second portion, it can be released through the notch to improve the release effect of the internal stress and reduce the risk of warping of the slit adhesive; as for the problem of light leakage caused by the notch extending from the first portion to the second portion, since the notch only extends to the junction between the first portion and the second portion, the notch will not be provided on the second portion, that is, the notch will not be in the direction of the light-exiting, preventing the backlight module from the light leakage problem.

In one embodiment, as shown in FIG. 1 to FIG. 4, the backlight module 1 further includes:

a light guide plate 13 arranged between the reflective sheet 12 and the optical film 14; and a light source arranged on one side of the light guide plate 13;

wherein, the slit adhesive 15 is arranged on opposite sides of the backplane 11 and a side opposite to the side where the light source is arranged, the notch 154 is disposed on at least one of the slit adhesive 15 on opposite sides of the backplane 11 and the slit adhesive 15 on the side opposite to the side where the light source is disposed. By arranging the slit adhesive on the three sides of the backplane, a light incident side of the edge-type light source does not need to attaching the slit adhesive by providing a U-shaped folded edge, and when the slit adhesive is arranged on the other three sides, by arranging the notch on the slit adhesive, when internal stress generates, the internal stress is released through the notch, thereby preventing the slit adhesive from warping.

Specifically, the notches are arranged on the slit adhesive on opposite sides of the backplane and the side opposite to the side where the light source is arranged. By arranging the notch on the slit adhesive on the three sides of the backplane, when the slit adhesive is subjected to internal stress, the internal stress is released through the notch, thereby preventing the slit adhesive from warping.

Figure 3:
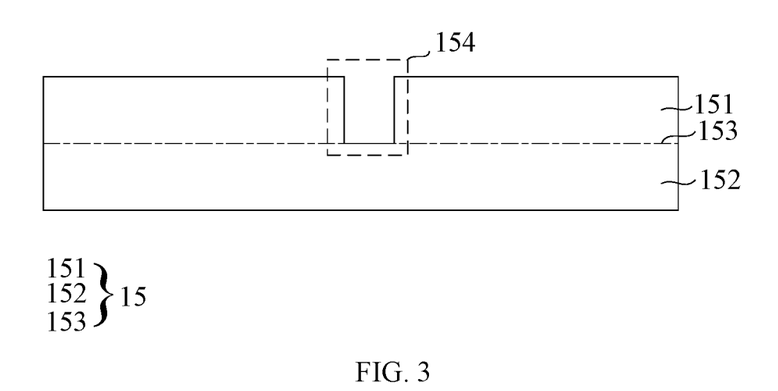
FIG. 3 is a second schematic diagram of a slit adhesive provided by the embodiment of the present application.
Figure 4:
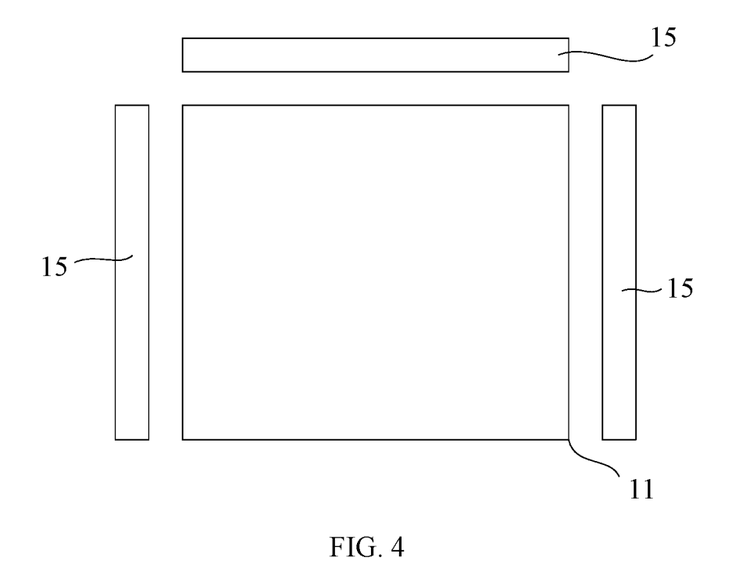
FIG. 4 is a second schematic diagram of a backlight module provided by an embodiment of the present application.

In an embodiment, as shown in FIG. 3, the slit adhesive 15 includes a notch 154, and the notch 154 is symmetrically arranged with respect to the central axis of the first portion 151 of the slit adhesive 15. By setting a notch, when the slit adhesive is subjected to internal stress, the internal stress is released through the notch, thereby preventing the slit adhesive from warping.

As to the problem of internal stress generating at different parts of the slit adhesive, internal stress will cause the problem of warping of the slit adhesive. In one embodiment, the notch includes at least a first notch and a second notch, and the first notch and the second notch are spaced apart from each other at the first portion of the slit adhesive. In addition, the notch includes the first notch and the second notch, and the first notch and the second notch are spaced apart from each other on the first portion of the slit adhesive, so that when the internal stress exists in the slit adhesive, the internal stress in the slit adhesive can be released through the first notch and the second notch to be exempt from the problem that the internal stress cannot be released from a notch after the internal stress generates, thus improving the release effect of the internal stress and reducing the risk of warping of the slit adhesive.

Specifically, as shown in FIG. 2, the slit adhesive 15 includes a plurality of notches 154. By setting the notches at intervals, for example, the internal stress generates in the part of the slit adhesive close to the left side, the internal stress can be released through the notch on the left side, and the conductive internal stress is released through the notch on the right side, and when the internal stress generates in the part of the slit adhesive close to the right, the internal stress can be released through the notch on the right side, and the conductive internal stress is released through the notch on the left side. The internal stress generates in the middle part can be released through the notches on opposite sides, and the internal stress generates in different parts can be released through the notches set at intervals to prevent the slit adhesive from warping.

In an embodiment, a distance between the first notch and a central axis of the first portion of the slit adhesive is equal to a distance between the second notch and the central axis of the first portion of the slit adhesive, and widths of the first notch and the second notch are equal. By making the first notch and the second notch evenly arrange on the first portion of the slit adhesive, when internal stress generates in the slit adhesive, no matter where the internal stress generates, the first and second notches of the slit adhesive are evenly arranged, so that the stress can be transmitted to the first notch and the second notch for release, and since the first notch and the second notch extend from the edge of the first portion to the junction between the first portion and the second portion, the internal stress generating in each part in the longitudinal direction can be released to the first and second notches to prevent the slit adhesive from warping.

Specifically, for example, when there is only one first notch and one second notch, the first portion is divided into left and right parts of equal width based on the central axis of the first portion of the slit adhesive, and then the first notch and the second notch are divided into two parts of equal width. They are respectively arranged in the two equal-width parts of the first portion, and the first notch and the second notch can be respectively located at the central axis of the two equal-width parts of the first portion, so that the first notch and the second notch are evenly distributed so that the internal stress can be relieved through the first notch and the second notch.

Specifically, the first portion of the slit adhesive can be divided into three parts of equal width by the first notch and the second notch. In this case, the distance between the first notch and the second notch is equal to the distance between the first notch and the first portion, and is equal to the distance between the second notch and an edge of the side of the first notch closest to the second notch, that is, the first notch and the second notch are respectively defined at one third and two thirds positions of the first portion, so that the first notch and the second notch divide the slit adhesive into three equal parts, so that when the internal stress generates, the internal stress can be conducted to the first notch and the second notch for release, thus preventing the warping of the slit adhesive.

In an embodiment, the first portion of the slit adhesive includes a plurality of notches, and a distribution density of the notches located at a middle region of the first portion of the slit adhesive is greater than or equal to a distribution density of the notches located at an edge region of the first portion of the slit adhesive. By making the distribution density of the notches at the middle region of the first portion of the slit adhesive greater than or equal to the distribution density of the notches in the first portion of the slit adhesive, when the internal stress generates in the slit adhesive, because the distribution density of the notches at the middle region is relatively large, it can improve the effect of releasing the stress from the notch, and by making the distribution density of the notch at the edge region relatively small, the bonding effect of the slit adhesive at the edge region to the folded edge of the backplane is better, preventing the slit adhesive from warping at the edge region due to a smaller bonding area, thus improving the bonding effect of the slit adhesive and the backplane.

Specifically, the distribution density of the notches at the edge region of the first portion of the slit adhesive is one-half to two-thirds of the distribution density of the notches at the middle region of the first portion of the slit adhesive. By reducing a number of the notches at the edge region of the slit adhesive, the bonding area between the edge region and the folded edge of the backplane is larger, thereby preventing the edge region from warping due to the too small bonding area.

In one embodiment, the first portion of the slit adhesive includes a plurality of notches, and a width of the notch located at the middle region of the first portion of the slit adhesive is larger than a width of the notch located at the edge region of the first portion of the slit adhesive. By making the width of the notch of the slit adhesive at the middle region larger than the width of the notch of the slit adhesive at the edge region, the slit adhesive at the edge region is more complete, and the bonding area between the slit adhesive at the edge region and the folded edge of the backplane is relatively large, thereby improving the bonding effect of the slit adhesive to the backplane.

Figure 5:
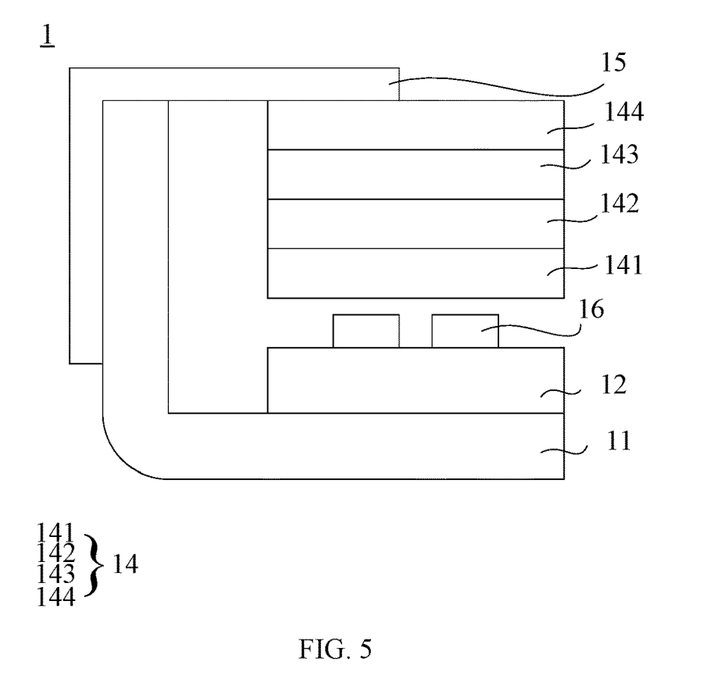
FIG. 5 is a third schematic diagram of a backlight module provided by an embodiment of the present application.
Figure 6:
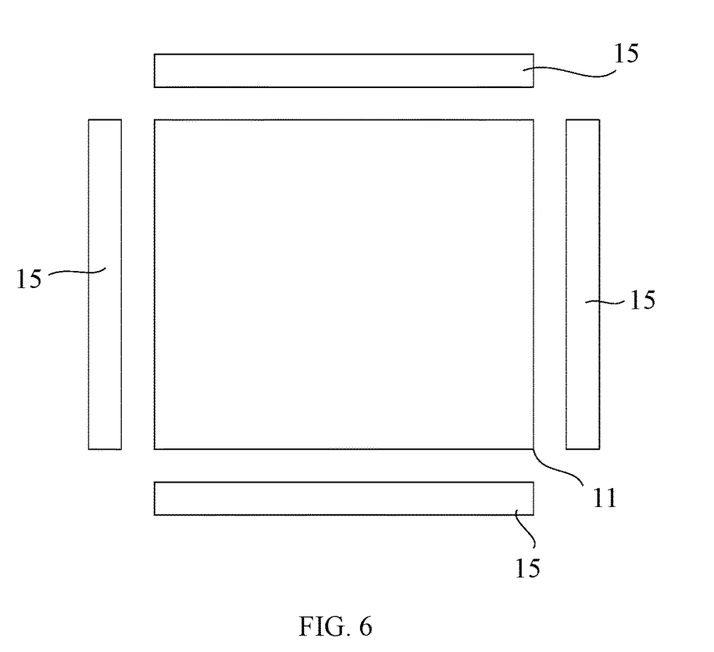
FIG. 6 is a fourth schematic diagram of a backlight module provided by the embodiment of the present application.

In an embodiment, as shown in FIGS. 5 and 6, the backlight module 1 further includes a light source 16, and the light source 16 is disposed between the reflective sheet 12 and the optical film 14. The slit adhesive 15 is disposed on at least one of four side surfaces of the backplane 11. By arranging the slit adhesive on at least one of the four side surfaces of the backplane, when the slit adhesive is arranged on the four side surfaces of the backplane, the slit adhesive is provided with the notch, so that when internal stress generates, the internal stress is released through the notch, thereby preventing the slit adhesive from warping.

Specifically, the notches are arranged on the four sides of the backplane, and the notches are arranged on the four sides of the backplane, so that when the slit adhesive is subjected to internal stress, the internal stress is released through the notch to prevent the slit adhesive from warping.

When a notch is formed on the first portion, the bonding area between the first portion and the folded edge of the backplane is reduced, resulting in the problem of separation. In an embodiment, as shown in FIG. 2, the slit adhesive 15 further includes a stitching line 153, the stitching line 153 is arranged at the junction between the first portion 151 and the second portion 152, and the distance between the first portion 151 of the slit adhesive 15 and the stitching line 153 is greater than or equal to the distance between the second portion 152 of the slit adhesive 15 and the stitching line 153. By making the width of the first portion of the slit adhesive larger than or equal to the width of the second portion of the slit adhesive, when a notch is formed on the first portion of the slit adhesive, the width of the first portion is larger, and the folded edge between the first portion and the backplane can be increased, thus improving the bonding effect of the first portion and the folded edge of the backplane, and preventing the first portion from warping.

Specifically, the distance between the first portion and the stitching line is equal to two-thirds to four-fifths of the length of the folded edge of the backplane. By making the bonding area between the first portion and the folded edge of the backplane relatively larger, the bonding effect of the first portion to the folded edge of the backboard is better, thereby preventing the first portion from peeling off, and the folded edge of the backplane is a curved surface at the contact part with the bottom edge, and does not need to attach to the first portion.

In an embodiment, as shown in FIG. 2, the width L of the notch 154 is greater than or equal to 0.5 mm. In order to improve a cutting accuracy of the notch, the width of the notch can be greater than or equal to 0.5 mm, so that the position where the notch is formed is more accurate, preventing the problem of shifting or cutting damage to the first portion.

In an embodiment, the cross-sectional shape of the notch includes at least one of square, rectangle, or trapezoid.

In the above-mentioned embodiment, the notch extending from the edge of the first portion to the junction between the first portion and the second portion is taken as an example for detailed description. In the embodiment of the present application, internal stress will generate at both the first portion and the second portion of the slit adhesive, and the notch is extended from the edge of the first portion to the junction between the first portion and the second portion, so that the internal stress in the first portion and the second portion can be released from the notch to prevent the slit adhesive from warping, and the notch will not be set on the second portion to cause light leakage.

Specifically, when the environment changes, for example, in a use state or a test state, the temperature and/or humidity changes, which causes the slit adhesive to expand or contract, resulting in internal stress. By providing the notch, the position where the notch is provided can buffer the expanded or contracted part to release the internal stress at the position where the notch is provided, thereby preventing the slit adhesive from warping caused by the internal stress.

In one embodiment, the notch extends from an edge of the first portion away from the second portion to the second portion, the side of the notch close to the junction is located on the second portion, and a light-shielding layer is provided on the notch of the second portion. When the second portion is provided with the notch, the effect of releasing the internal stress in the slit adhesive can be further enhanced. By arranging the light-shielding layer on the notch of the second portion, the light will not leak from the notch of the second portion, thereby preventing the slit adhesive from causing the light leakage of the backlight module when the internal stress of the slit adhesive is released.

Specifically, the light-shielding layer is not particularly limited to a light-shielding material, and the light-shielding layer can block the light and change the angle of the light, which includes, but is not limited to, reflecting the light and refracting the light, so as to prevent the light from leaking through the notch of the second portion.

It should be noted that, in the above embodiments, the structure, shape, distribution density, installation position, etc. of the notches are described in detail from various angles. However, the embodiments of the present application do not particularly limit that only the structure, shape, distribution density, and arrangement position of the notches can be described in each embodiment. Rather, multiple embodiments can be combined when there is no conflict between the embodiments. For example, the first portion of the slit adhesive includes a plurality of notches, and the distribution density of the notches located at the middle region of the first portion of the slit adhesive is greater than or equal to the distribution density of the notches located at the edge region of the first portion of the slit adhesive, and the width of the notch located at the middle region of the first portion of the slit adhesive is greater than the width of the notch located at the edge region of the first portion of the slit adhesive. By reducing the number of the notches at the edge region of the slit adhesive and making the width of the notch at the edge region smaller than the width of the notch at the middle region, when the internal stress generates in the slit adhesive, the internal stress is released through the notch at the middle region and the edge region, and the bonding area between the edge region and the folded edge of the backplane is larger, thereby preventing the edge region from warping due to the too small bonding area. Other embodiments may also be combined, which will not be repeated herein for brevity.

In one embodiment, as shown in FIG. 1, the optical film 14 includes a color conversion film 141, a homogenizer film 142, a prism sheet 143, and a diffusion sheet 144.

In one embodiment, the light source includes a blue light-emitting diode, a white light-emitting diode, or one of a blue light-emitting diode, a red light-emitting diode. and a green light-emitting diode.

Figure 7:
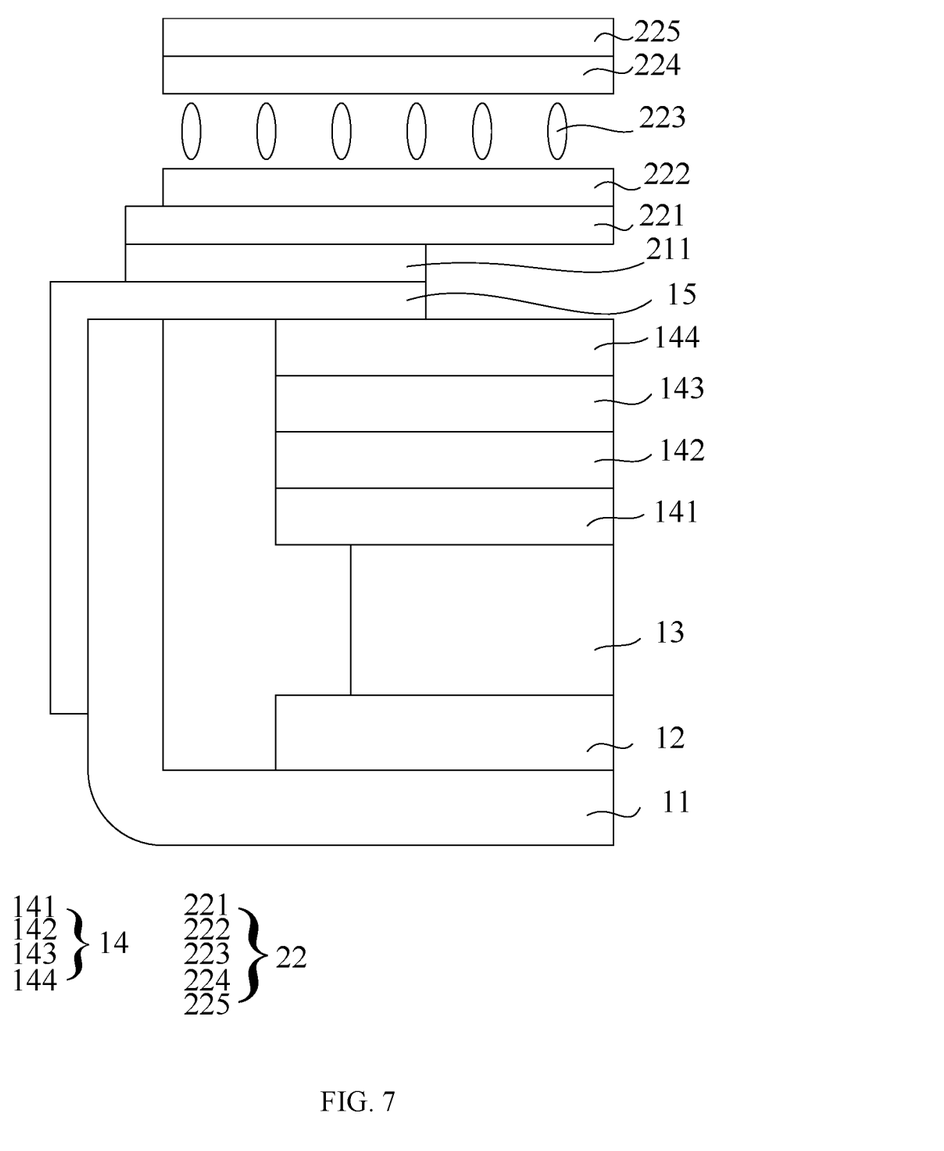
FIG. 7 is a schematic diagram of a liquid crystal display device provided by an embodiment of the present application.

Meanwhile, as shown in FIG. 2 and FIG. 7, an embodiment of the present application provides a liquid crystal display device, the liquid crystal display device includes a liquid crystal display panel 22 and a backlight module, and the backlight module includes:

a backplane 11;

a reflective sheet 12 disposed on one side of the backplane 11; and an optical film 14 disposed on a side of the reflective sheet 12 away from the backplane 11, wherein the backlight module 1 further includes a slit adhesive 15, the slit adhesive 15 includes a first portion 151 located on a folded edge of the backplane 11 and a second portion 152 located on a side of the optical film 14 away from the reflective sheet 12, and the first portion 151 is formed with a notch 154.

The present application provides a liquid crystal display device, the liquid crystal display device includes a liquid crystal display panel and a backlight module, the first portion of the slit adhesive is formed with a notch, so that when internal stress generates in the slit adhesive due to environmental changes, the internal stress can be released through the notch, thereby preventing the slit adhesive from warping and improving the yield of the backlight module.

In an embodiment, as shown in FIG. 7, the liquid crystal display device further includes an adhesive layer 211, and the adhesive layer 211 is disposed between the liquid crystal display panel 22 and the backlight module.

In one embodiment, the notch extends from an edge of the first portion away from the second portion to the second portion, the side of the notch close to the junction is located on the second portion, and the adhesive layer is a light-shielding material. By making the adhesive layer a light-shielding material, when the notch is set in the second portion, the light will not leak from the notch, so that the internal stress of the slit adhesive can be released from the notch while preventing light leakage from the notch.

In an embodiment, as shown in FIG. 7, the liquid crystal display panel includes a first polarizer 221, a first substrate 222, a liquid crystal layer 223, a second substrate 224, and a second polarizer 225.

In one embodiment, the first substrate is an array substrate, the second substrate is a color filter substrate, or the first substrate is a color on array (COA, the color filter layer disposed on the array side) substrate.

In an embodiment, in the liquid crystal display device, the notch extends from an edge of a side of the first portion away from the second portion toward the second portion, and a side of the notch is located at a junction between the first portion and the second portion.

In an embodiment, in the liquid crystal display device, the backlight module further includes:
a light guide plate disposed between the reflective sheet and the optical film; and
a light source disposed on one side of the light guide plate;
wherein the slit adhesive is disposed on opposite sides of the backplane and on a side opposite to a side where the light source is disposed, the notch is disposed on at least one of the slit adhesive on opposite sides of the backplane and the slit adhesive on the side opposite to the side opposite to the side where the light source is disposed.

In an embodiment, in the liquid crystal display device, the notch includes at least a first notch and a second notch, and the first notch and the second notch are spaced apart from each other at the first portion of the slit adhesive.

In an embodiment, in the liquid crystal display device, a distance between the first notch and a central axis of the first portion of the slit adhesive is equal to a distance between the second notch and the central axis of the first portion of the slit adhesive, and widths of the first notch and the second notch are equal.

In an embodiment, in the liquid crystal display device, the first portion of the slit adhesive includes a plurality of notches, and a distribution density of the notches located at a middle region of the first portion of the slit adhesive is greater than or equal to a distribution density of the notches located at an edge region of the first portion of the slit adhesive.

In an embodiment, in the liquid crystal display device, the backlight module further includes a light source, the light source is disposed between the reflective sheet and the optical film, and the slit adhesive is disposed on at least one of four sides of the backplane.

In an embodiment, in the liquid crystal display device, the slit adhesive further includes a stitching line, the stitching line is disposed at the junction between the first portion and the second portion, a distance between the first portion of the slit adhesive and the stitching line is greater than or equal to a distance between the second portion of the slit adhesive and the stitching line.

In one embodiment, the distance between the first portion and the stitching line is equal to two-thirds to four-fifths of the length of the folded edge of the backplane.

In an embodiment, in the liquid crystal display device, the notch extends from an edge of a side of the first portion away from the second portion toward the second portion, a distance between a side of the notch close to the junction between the first portion and the second portion is greater than zero; or a side of the notch close to the junction is located at the second portion.

In one embodiment, the width of the notch is greater than or equal to 0.5 mm.

According to the above embodiments, it can be known that:
the present application provides a backlight module and a liquid crystal display device; the backlight module includes a backplane, a reflective sheet, and an optical film, the reflective sheet is arranged on one side of the backplane, and the optical film is arranged on the side of the reflective sheet away from the backplane, wherein the backlight module further includes a slit adhesive, the slit adhesive includes a first portion located on the folded edge of the backplane and a second portion located on the side of the optical film away from the reflective sheet, and the first portion is formed with a notch. In the present application, the first portion of the slit adhesive is formed with a notch, so that when internal stress generates in the slit adhesive due to environmental changes, the internal stress can be released through the notch, thereby preventing the slit adhesive from warping and improving the yield of the backlight module.

In the above embodiments, the descriptions of each embodiment have their own emphasis. The parts that are not described in detail in an embodiment can be referred to the detailed descriptions in other embodiments above, which will not be repeated herein for brevity.

The backlight module and the liquid crystal display device provided in the embodiments of the present application have been described in detail above. Specific examples are used in this document to explain the principles and implementation of the present invention. The descriptions of the above embodiments are only for understanding the method of the present invention and its core ideas, to help understand the technical solution of the present application and its core ideas, and a person of ordinary skill in the art should understand that it can still modify the technical solution described in the foregoing embodiments, or equivalently replace some of the technical features. Such modifications or replacements do not depart the spirit of the corresponding technical solutions beyond the scope of the technical solutions of the embodiments of the present application.

What is claimed is:
1. A backlight module, comprising:
a backplane;
a reflective sheet disposed on one side of the backplane; and
an optical film disposed on a side of the reflective sheet away from the backplane,
wherein the backlight module further comprises a slit adhesive, the slit adhesive comprises a first portion located on a folded edge of the backplane and a second portion located on a side of the optical film away from the reflective sheet, and the first portion is formed with a notch; and
wherein the slit adhesive further comprises a stitching line, the stitching line is disposed at the junction of the first portion and the second portion, a distance between the first portion of the slit adhesive and the stitching line is greater than or equal to a distance between the second portion of the slit adhesive and the stitching line, and a width of the first portion of the slit adhesive is larger than or equal to a width of the second portion of the slit adhesive.

2. The backlight module according to claim 1, wherein the notch extends from an edge of a side of the first portion away from the second portion toward the second portion, and a side of the notch is located at a junction between the first portion and the second portion.

3. The backlight module according to claim 2, wherein the backlight module further comprises:
a light guide plate disposed between the reflective sheet and the optical film; and
a light source disposed on one side of the light guide plate;
wherein the slit adhesive is disposed on opposite sides of the backplane and on a side opposite to a side where the light source is disposed, the notch is disposed on at least one of the slit adhesive on opposite sides of the backplane and the slit adhesive on the side opposite to the side where the light source is disposed.

4. The backlight module according to claim 2, wherein the notch comprises at least a first notch and a second notch, and the first notch and the second notch are spaced apart from each other at the first portion of the slit adhesive.

5. The backlight module according to claim 4, wherein a distance between the first notch and a central axis of the first portion of the slit adhesive is equal to a distance between the second notch and the central axis of the first portion of the slit adhesive, and widths of the first notch and the second notch are equal.

6. The backlight module as claimed in claim 2, wherein the first portion of the slit adhesive comprises a plurality of notches, and a distribution density of the notches located at a middle region of the first portion of the slit adhesive is greater than or equal to a distribution density of the notches located at an edge region of the first portion of the slit adhesive.

7. The backlight module according to claim 2, wherein the backlight module further comprises a light source, the light source is disposed between the reflective sheet and the optical film, and the slit adhesive is disposed on at least one of four sides of the backplane.

8. The backlight module according to claim 1, wherein the notch extends from an edge of a side of the first portion away from the second portion toward the second portion, a distance between a side of the notch close to the junction of the first portion and the second portion is greater than zero; or a side of the notch close to the junction is located at the second portion.

9. A liquid crystal display device, comprising a liquid crystal display panel and a backlight module, the backlight module comprising:
   a backplane;
   a reflective sheet disposed on one side of the backplane; and
   an optical film disposed on a side of the reflective sheet away from the backplane,
   wherein the backlight module further comprises a slit adhesive, the slit adhesive comprises a first portion located on a folded edge of the backplane and a second portion located on a side of the optical film away from the reflective sheet, and the first portion is formed with a notch; and
   wherein the slit adhesive further comprises a stitching line, the stitching line is disposed at the junction of the first portion and the second portion, a distance between the first portion of the slit adhesive and the stitching line is greater than or equal to a distance between the second portion of the slit adhesive and the stitching line, and a width of the first portion of the slit adhesive is larger than or equal to a width of the second portion of the slit adhesive.

10. The liquid crystal display device according to claim 9, wherein the notch extends from an edge of a side of the first portion away from the second portion toward the second portion, and a side of the notch is located at a junction between the first portion and the second portion.

11. The liquid crystal display device according to claim 10, wherein the backlight module further comprises:
   a light guide plate, disposed between the reflective sheet and the optical film;
   a light source, disposed on one side of the light guide plate;
   wherein the slit adhesive is disposed on opposite sides of the backplane and on a side opposite to a side where the light source is disposed, the notch is disposed on at least one of the slit adhesive on opposite sides of the backplane and the slit adhesive on the side opposite to the side where the light source is disposed.

12. The liquid crystal display device according to claim 10, wherein the notch comprises at least a first notch and a second notch, and the first notch and the second notch are spaced apart from each other at the first portion of the slit adhesive.

13. The liquid crystal display device according to claim 12, wherein a distance between the first notch and a central axis of the first portion of the slit adhesive is equal to a distance between the second notch and the central axis of the first portion of the slit adhesive, and widths of the first notch and the second notch are equal.

14. The liquid crystal display device according to claim 10, wherein the first portion of the slit adhesive comprises a plurality of notches, and a distribution density of the notches located at a middle region of the first portion of the slit adhesive is greater than or equal to a distribution density of the notches located at an edge region of the first portion of the slit adhesive.

15. The liquid crystal display device according to claim 10, wherein the backlight module further comprises a light source, the light source is disposed between the reflective sheet and the optical film, and the slit adhesive is disposed on at least one of four sides of the backplane.

16. The liquid crystal display device according to claim 9, wherein a distance between the first portion and the stitching line is equal to two-thirds to four-fifths of a length of the folded edge of the backplane.

17. The liquid crystal display device according to claim 9, wherein the notch extends from an edge at a side of the first portion away from the second portion toward the second portion, a distance between a side of the notch close to the junction of the first portion and the second portion is greater than zero; or a side of the notch close to the junction is located at the second portion.

18. The liquid crystal display device according to claim 17, wherein a width of the notch is greater than or equal to 0.5 mm.

* * * * *